United States Patent

Altenburger

[15] 3,699,265

[45] Oct. 17, 1972

[54] LINE LOCKOUT CIRCUIT

[72] Inventor: Otto Altenburger, Rochester, N.Y.

[73] Assignee: Stromberg-Carlson Corporation, Rochester, N.Y.

[22] Filed: June 15, 1971

[21] Appl. No.: 153,232

Related U.S. Application Data

[63] Continuation-in-part of Ser. No. 108,381, Jan. 21, 1971.

[52] U.S. Cl...................................179/19, 179/18 FA

[51] Int. Cl................................................H04m 3/08

[58] Field of Search ....................179/18 F, 18 FA, 19

[56] References Cited

UNITED STATES PATENTS

| | | | |
|---|---|---|---|
| 2,650,950 | 9/1953 | Kessler | 179/18 F |
| 3,156,777 | 11/1964 | Horwitz et al. | 179/18 F |
| 3,378,642 | 4/1968 | Gagnier et al. | 179/18 F |

*Primary Examiner*—Thomas W. Brown
*Attorney*—Charles C. Krawczyk

[57] ABSTRACT

A lockout circuit for connection in a telephone switching exchange utilizes a lockout relay to isolate a telephone line from common switching equipment in the exchange whenever a telephone receiver and/or the connected telephone line form a closed loop path and no attempt is made to complete a call within a prescribed period. Removal of the ground connection to the sleeve lead by the conventional timer in the trunk circuit energizes an operate winding of the lockout relay. The relay also has a hold winding connected through a set of its own contacts and the subscriber's line, and remains held up so long as the line loop remains closed.

11 Claims, 2 Drawing Figures

OTTO ALTENBURGER
INVENTOR.

BY Charles C. Krawczyk
ATTORNEY

OTTO ALTENBURGER
INVENTOR.

BY Charles C. Krawczyk
ATTORNEY

LINE LOCKOUT CIRCUIT

CROSS REFERENCE TO RELATED APPLICATIONS

This application is a Continuation-In-Part of a copending patent application entitled "Line Lockout Circuit," Ser. No. 108,381, filed on Jan. 21, 1971.

BRIEF DESCRIPTION OF THE INVENTION

This invention relates to a novel lockout circuit arrangement for a telephone exchange.

In telephone exchanges, it is desirable to release a subscriber's line circuit if his line loop remains closed longer than a preselected, fairly brief interval, during which he has not attempted to place a call. Otherwise, common equipment in the exchange is tied up for uneconomically long periods at times when the subscriber has left his telephone off hook or his line has been short-circuited.

The lockout arrangement of the invention accomplishes this function with but little added equipment and very simply. In many types of automatic telephone exchanges, the sleeve lead corresponding to the subscriber's line circuit is marked with a ground connection when the subscriber goes off hook, or his line loop is closed for any other reason, and a time-out arrangement is provided to switch the line to a special trunk circuit if the start of the off hook condition is not followed by dial pulses. The trunk circuit then performs a series of functions, and finally removes the ground connection from the sleeve lead. At this time it is desired to lock out the line. The circuit of the invention is designed to disconnect the line from the switching network in response to the removal of the ground connection by the special trunk circuit, and to keep the line disconnected so long as the off hook condition persists.

Briefly, in accordance with the invention, the sleeve lead corresponding to the line circuit is connected to a battery terminal of the exchange through a resistor, and a capacitor is connected between the sleeve lead and ground to be discharged when a hold signal is applied to the sleeve lead, and to become charged when the hold signal is removed from the sleeve lead. A transistor is connected in series with the operate winding of the lockout relay, and is arranged to become conductive during the charging period of the capacitor to cause the relay to pick up. Once picked up, the relay is held up by its hold winding so long as the off hook condition persists on the line. The hold winding is connected in series with the line loop when the relay is picked up, and becomes de-energized, releasing the relay, when the off hook condition ends. Additional contacts are provided on the lockout relay to operate a lockout display, or to mark a lead for detection by a lockout scanner, and for other purposes as desired.

In accordance with a first embodiment of the invention, the line lockout circuit is adapted for connection between a line circuit and the telephone line.

In accordance with a second embodiment of the invention, the line lockout circuit is adapted to be connected to a link interconnection between stages of a switching network.

DESCRIPTION OF THE PREFERRED EMBODIMENTS

Figure 1:
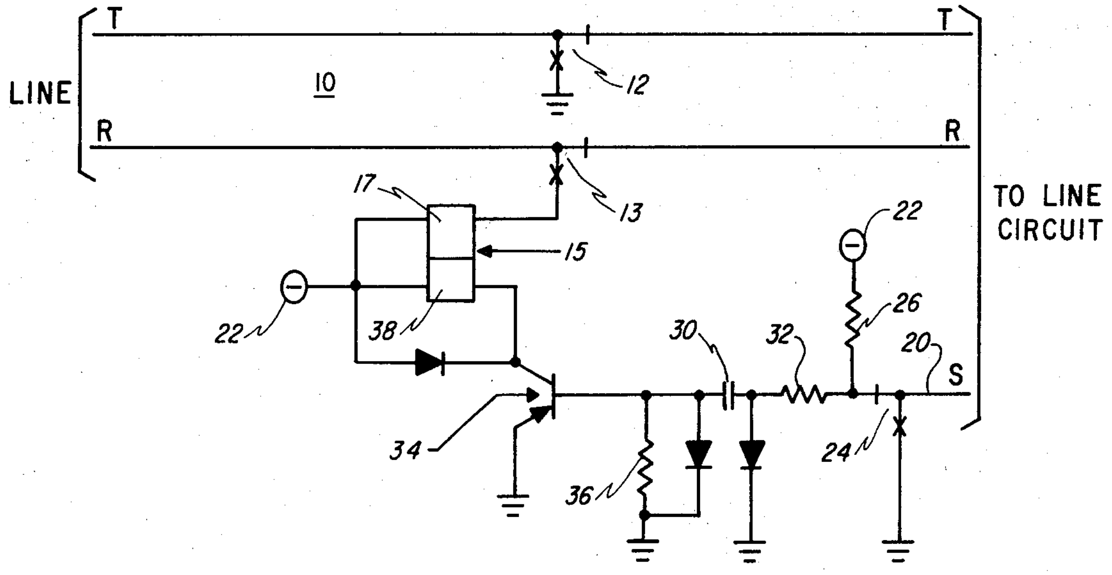
FIG. 1 shows a first embodiment of the invention wherein the lockout circuit is designed for connection between an individual telephone line and its associated line circuit.

Referring to the first embodiment of the invention shown in FIG. 1, a subscriber's telephone line 10 is connected to his line circuit (not shown) through a pair of double throw contacts 12 and 13, respectively, of the lockout relay 15. The contacts 12 and 13 normally connect the line 10 to the line circuit, and, when the relay 15 is operated, connect one of the leads to ground and the other to one terminal of the hold winding 17 of the relay. The sleeve lead 20 from the line circuit is connected to the ungrounded battery terminal 22 of the exchange (normally the negative terminal) through a normally closed contact 24 of the lockout relay and a resistor 26. A capacitor 30 is connected on one side to the sleeve lead 20 through another resistor 32, and on its other side to the base of a transistor 34, and through a resistor 36 to ground. The emitter of the transistor 34 is grounded so the transistor is normally held at cut-off.

The collector of the transistor 34 is connected to the battery terminal 22 through the operate winding 38 of the lockout relay.

When an off hook condition arises on the line, common equipment in the exchange marks the sleeve lead 20 with a ground connection and the capacitor 30 discharges. When the ground connection is thereafter removed from the sleeve lead 20, the capacitor 30 starts to charge, driving the transistor 34 momentarily to saturation, and thereby causing the operate winding 38 to pick up the relay. If the line 10 is now on hook, the relay 15 drops out very quickly. If it is still off hook, the relay 15 is held picked up by its hold winding 17, the circuit for which is completed through the now operated double throw contacts 12 and 13 and the line loop. The hold winding 17 keeps the relay 15 picked up so long as the off hook condition persists.

When the line reverts to its on hook condition, it opens the energizing circuit for the hold winding, the hold winding 17 is de-energized, and the relay drops out, restoring normal service conditions.

Additional contacts may be provided on the relay 15 as desired to work into any desired type of auxiliary equipment such as, for example, an alarm display or accumulator, in accordance with the designer's choice.

Figure 2:
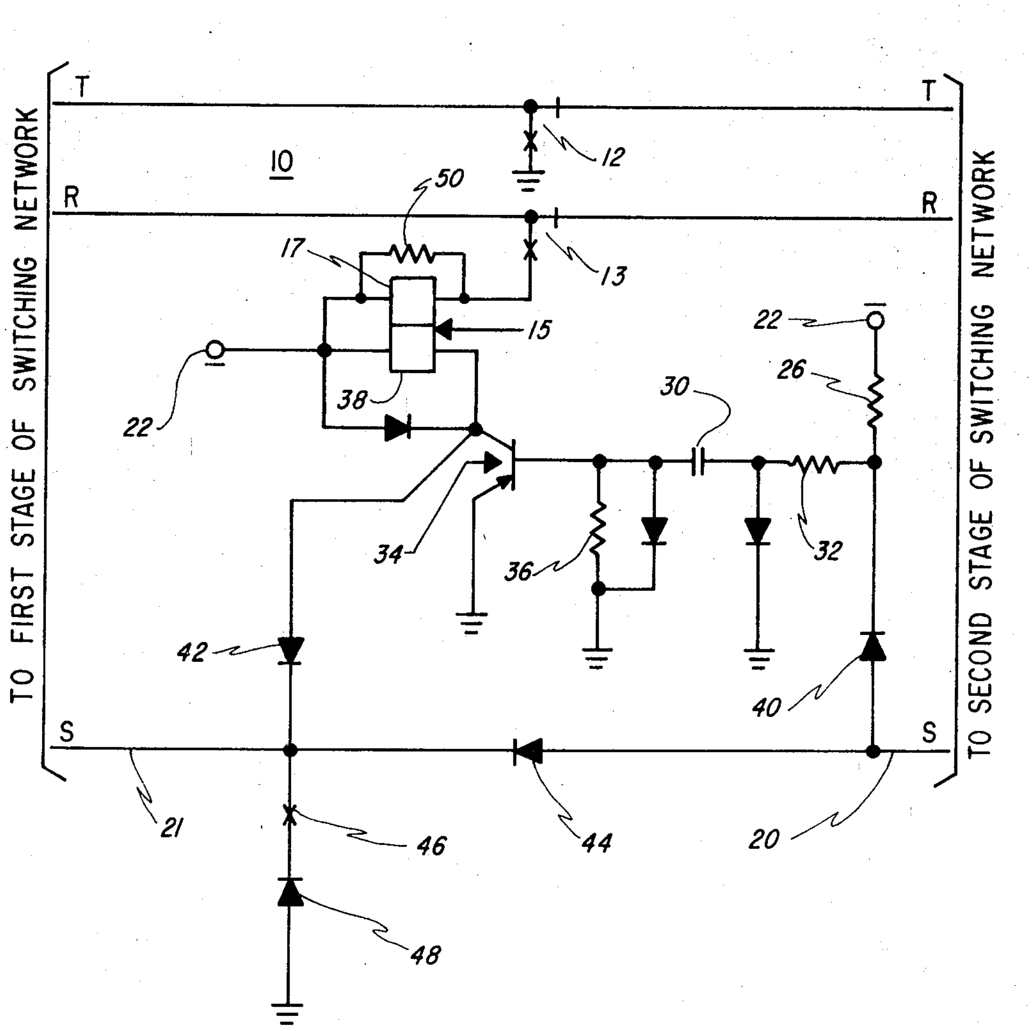
FIG. 2 shows a second embodiment of the invention wherein the lockout circuit is designed for connection between the stages of a switching network in a telephone exchange.

Rather than including the lockout circuit on an individual line circuit basis, the lockout circuit can be modified as illustrated in FIG. 2 to be provided on a per link basis between stages of a switching network to which the line circuits are connected. The switching network can, for example, comprise a multistage crosspoint switching matrix wherein the crosspoints in each stage are connected to crosspoints of adjacent stages by links or link interconnections. Each link, for example, can include the tip and ring conductors, a mark conductor for actuating the crosspoint and a sleeve conductor for holding the crosspoints actuated. Since the links between the stages of the network are fewer in number than the number of line circuits connected to the network, it may be preferred, on an economic basis, to provide a lockout arrangement for connection to links rather than on a per line basis.

The second embodiment of the invention shown in FIG. 2 is basically the same lockout circuit as illustrated in FIG. 1. However, since this second embodiment is designed for connection between stages in the switching network of a telephone exchange rather than between an individual telephone line and its associated line circuit, a slight modification is required for applying a ground connection to the line circuit cutoff relay of the locked out line during the lockout condition.

The same reference numbers are used in both figures. The second embodiment of FIG. 2 includes the components of the first embodiment with the exception of the contacts 24. In the second embodiment, one end of the sleeve lead 20 is connected to the junction of resistors 32 and 26 through a diode 40, and the other end of the sleeve lead 21 is connected to the collector of transistor 34 through a diode 42. The two ends of the sleeve leads 20 and 21 are separated by a diode 44. The junction of diodes 42 and 44 is connected to the ground terminal through the normally open contacts 46 of the lockout relay 15 and a diode 48.

The initial ground connection applied to the sleeve lead 20 in response to a closed loop condition is passed onto the lockout circuit through diode 40 (diode 42 blocks the ground connection so that current cannot flow via this path). When no attempt to complete the call is made within the prescribed period, the ground connection is removed, thereby permitting capacitor 30 to charge, which, in turn, drives the transistor 34 momentarily to saturation and energizes the operate winding 38 (as previously described). From the moment the ground connection is removed and until the contacts of the relay 15 operate, the cutoff relay of the associated line circuit (not shown) is held operated by a ground connection via the saturated transistor 34, the diode 42 and the sleeve lead 21. This prevents the locked out line circuit from being seized by the line scanner-marker circuit during the period between the removal of the signal ground from the sleeve lead and the operation of the relay 15. Once the contacts of relay 15 operate, the cutoff relay is held operated by a ground connection via the contacts 46 and the diode 48. Diodes 42 and 44 block the ground connection from feeding back into the lockout circuit.

An additional feature shown in the second embodiment, equally applicable to the first, is a resistor 50 connected across the holding coil of relay 15 to render it less sensitive so that when an abnormal line condition is corrected and the telephone loop is opened, relay 15 is not held operated by a current which can flow through the telephone line via the leakage resistance normally linking the telephone wires.

Both embodiments of the invention provide a new and improved lockout circuit employing standard components which is readily adaptable for connection in existing as well as new telephone switching systems. The first embodiment requires a lockout circuit for each telephone line which is to be provided with the lockout feature. The second embodiment requires a lockout circuit for each link of the line link network which is to be provided with the lockout feature.

What is claimed is:

1. A line lockout circuit for connection between a subscriber's line and the line circuit normally assigned to the line at a telephone exchange to disconnect the line from the line circuit in response to the removal of a ground connection from the sleeve lead of the line circuit by other equipment in the exchange and thereafter to keep the line disconnected so long as it is in an off hook condition, said lockout circuit comprising:

a. a relay having an operate winding capable of picking up the relay, and a hold winding capable of holding the relay in its picked up condition, b. a set of contacts on said relay normally connecting the line to the line circuit, and, when the relay is picked up, disconnecting the line from the line circuit and connecting one lead of the line to ground and the other lead of the line to one terminal of said hold winding, the other terminal of said hold winding being connected to a current source at a potential different from ground, and c. means responsive to removal of a ground connection from the sleeve lead momentarily to energize said operate winding.

2. A line lockout circuit according to claim 1 wherein said means includes a transistor having its collector-to-emitter current path connected in series with said operate winding, and a capacitor arranged to render said transistor strongly conductive for a brief interval immediately following removal of a ground connection from the sleeve lead.

3. A lockout circuit for connection to the tip, ring and sleeve leads of a link between stages of a multistage switching network, wherein telephone circuits are connected to one end of the network for connection through the network to common equipment connected to the other end of the network, said lockout circuit being responsive to the removal of a hold signal from the sleeve lead while a telephone circuit connected through the link is in an off hook condition for disabling the link as long as the off hook condition exists, said lockout circuit comprising:

a. a relay having an operate winding and a hold winding;

b. a set of contacts on said relay normally interconnecting the tip and ring leads of the link between the stages of said network and, when the relay is picked up, opening the tip and ring leads and connecting one of said tip and ring leads to one power terminal and the other one of the tip and ring leads to one terminal of said hold winding, the other terminal of said hold winding being connected to another power terminal, and c. circuit means responsive to removal of a hold signal from the sleeve lead to momentarily energize said operate winding causing the relay to pick up.

4. A lockout circuit according to claim 3 wherein said circuit means includes a transistor having its collector-to-emitter current path connected in series with said operate winding, and a capacitor arranged to render said transistor conductive for a brief interval immediately following removal of a ground connection from the sleeve lead to operate said relay.

5. A lockout circuit according to claim 4 including circuit means interconnecting the collector of said transistor, said sleeve lead and said ground connection so that a hold signal is applied to said sleeve lead via said transistor in the interim period between the removal of said hold signal from said sleeve lead and the operation of said relay and thereafter the hold signal is applied directly to said sleeve lead until the off hook condition is terminated.

6. A telephone lockout circuit comprising:

a. a relay having operate and hold coils;

b. circuit means for connecting of said relay to tip and ring leads so that when the relay is unoperated the circuit through the tip and ring leads is completed and when said relay is operated the tip and ring leads are open circuited and one of the tip and ring leads is connected to a power terminal while the other of the tip and ring leads is connected through the hold winding to another power terminal, and c. circuit means for connecting said operate coil of said relay to a sleeve lead so that when a hold signal is removed from said sleeve lead, the operate coil is momentarily energized to actuate the relay.

7. A telephone lockout circuit according to claim 6 wherein said circuit means for connecting said operate coil of said relay to the sleeve lead includes a transistor having its collector-to-emitter circuit path connected in series with said operate winding, and a capacitor arranged to render said transistor conductive for a brief interval immediately following removal of a hold signal from the sleeve lead to operate said relay.

8. A lockout circuit for isolating a telephone line from common switching equipment in a telephone exchange whenever a closed loop path through said telephone line exists and no attempt is made to complete a call within a prescribed period comprising:

a. circuit means connected in series with the electrical path between said telephone line and said common switching equipment for interrupting said electrical path;

b. latching circuit means coupled to said circuit means and said electrical path such that the actuation of said latching circuit means in response to a momentary signal causes said circuit means to interrupt said electrical path and wherein said latching circuit means remains actuated so long as a closed loop path exists through said telephone line, and c. switching circuit means connected between said latching circuit means and said common switching equipment responsive to removal of a hold signal applied to said switching circuit means by said telephone exchange to apply a momentary signal to actuate said latching circuit means.

9. A lockout circuit according to claim 8:

a. wherein said latching circuit means includes a dual coil lockout relay having an operate winding and a hold winding, said hold winding being connected in series with said telephone line between the terminals of a DC power source when said operate winding is energized, and b. wherein said switching circuit means includes a transistor whose collector-emitter path is connected in series with the operate winding of said lockout relay between the terminals of the DC power source so that said relay is actuated when said transistor is turned on.

10. A lockout circuit according to claim 9 wherein said circuit means includes a pair of normally closed contacts of said lockout relay, each one of said contacts being connected in series with one conductor of said electrical path and includes a pair of normally open contacts of said lockout relay, one of said normally open contacts being connected between one of the conductors of said electrical path and a ground terminal of the DC power source and the other of said contacts being connected between the other conductor of said electrical path and one terminal of said hold winding.

11. A lockout circuit according to claim 9 wherein said switching circuit means includes a resistive-capacitive circuit connected to said common switching equipment and the base of said transistor so that when the hold signal applied thereto is removed, a capacitor is charged from the DC power source with a polarity designed to forward bias said transistor so that said transistor is rendered conductive momentarily.

* * * * *